United States Patent
Goldsmith (10) Patent No.: US 7,516,112 B1
(45) Date of Patent: Apr. 7, 2009

(54) FLEXIBLE, SECURE AGENT DEVELOPMENT FRAMEWORK

(75) Inventor: Steven Y. Goldsmith, Rochester, MN (US)

(73) Assignee: Sandia Corporation, Albuquerque, NM (US)

( * ) Notice: Subject to any disclaimer, the term of this patent is extended or adjusted under 35 U.S.C. 154(b) by 489 days.

(21) Appl. No.: 11/388,278

(22) Filed: Mar. 24, 2006

(51) Int. Cl.
*G06F 17/00* (2006.01)
*G06N 5/02* (2006.01)

(52) U.S. Cl. .............................. 706/46; 706/47; 706/48
(58) Field of Classification Search .................. 706/46, 706/47, 48; 709/224
See application file for complete search history.

(56) References Cited

U.S. PATENT DOCUMENTS

2003/0051026 A1* 3/2003 Carter et al. ................ 709/224
2003/0074206 A1* 4/2003 Hoffman et al. ............... 705/1
2004/0098358 A1* 5/2004 Roediger ..................... 706/46
2006/0178918 A1* 8/2006 Mikurak ....................... 705/7

* cited by examiner

*Primary Examiner*—Joseph P Hirl
(74) *Attorney, Agent, or Firm*—Robert D. Watson (57) ABSTRACT

While an agent generator is generating an intelligent agent, it can also evaluate the data processing platform on which it is executing, in order to assess a risk factor associated with operation of the agent generator on the data processing platform. The agent generator can retrieve from a location external to the data processing platform an open site that is configurable by the user, and load the open site into an agent substrate, thereby creating a development agent with code development capabilities. While an intelligent agent is executing a functional program on a data processing platform, it can also evaluate the data processing platform to assess a risk factor associated with performing the data processing function on the data processing platform.

20 Claims, 5 Drawing Sheets

FLEXIBLE, SECURE AGENT DEVELOPMENT FRAMEWORK

This invention was developed under Contract DE-AC04-94AL85000 between Sandia Corporation and the U.S. Department of Energy. The U.S. Government has certain rights in this invention.

FIELD OF THE INVENTION

The invention relates generally to agents and, more particularly, to the development of agents.

BACKGROUND OF THE INVENTION

An intelligent agent, or intelligent agent program (also referred to herein as simply an agent), can be thought of as a self-contained problem-solving system capable of autonomous, reactive, proactive, social behavior. Agents are clearly identifiable problem-solving entities with well-defined boundaries and interfaces. They are typically situated (embedded) in a particular environment over which they have partial control and observability. They receive inputs related to the state of their environment through sensors, and they act on the environment through effectors. Agents are designed to fulfill a specific role and have particular objectives to achieve. They are autonomous in that they have control over both their internal state and their own behavior. Agents are capable of exhibiting flexible problem-solving behavior in pursuit of their design objectives. They are both reactive, i.e., able to respond in a timely fashion to changes that occur in their environment, and proactive, i.e., able to adopt goals and take initiatives.

Intelligent agents are typically coupled to complex and dynamic environments, and the inputs of the intelligent agent are not readily defined or predictable. Examples of such complex and dynamic environments include control systems and/or security systems for large manufacturing enterprises. Such applications often require multiple agents that will need to interact with one another, either to achieve their individual objectives or to manage dependencies that ensue from being situated in a common environment. These interactions among intelligent agents can vary from simple information passing, through client/server-type interactions, to rich social interactions including the ability to cooperate, coordinate and negotiate about a course of action. In some situations, the agents may all be peers working together as a team, while in other situations, one agent may be the manager of the other agents.

Figure 1:
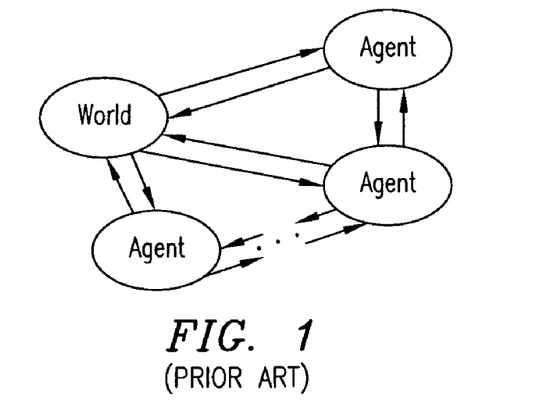
FIG. 1 illustrates a system including a plurality of intelligent agents according to the prior art.

FIG. 1 diagrammatically illustrates a multi-agent system according to the prior art. As shown in FIG. 1, a plurality of agents interact with their "world", that is, the environment in which they are operating. The agents can also communicate/interact with one another.

Due to the complex and often sensitive environments in which intelligent agents are typically deployed, it is desirable to provide for creation and deployment of intelligent agents in a flexible and secure manner.

According to exemplary embodiments of the invention, the lifecycle properties of an agent (security, performance, functionality, adaptation, etc.) throughout the phases of specification, design, construction (coding), testing, and through deployment and decommissioning are managed by introduction of immutable policies and constraints introduced at the various phases to ensure an operating envelope consistent with the intent of the concerned organizations. This is accomplished with an active (live) agent programming framework that enforces policies and constraints while enabling maximum innovation and adaptation within those constraints during direct human programming as well as agent enacted adaptations to its structure and performance during autonomous operation. This provides a bounded region within the design space within which many different instances of agents can be realized but with guarantees that those boundaries will not be exceeded. Advantages gained in security include some assurances that malicious code is not introduced by programmers during the design and programming phases, limitations on misuse of the agent system during test and deployment, proliferation controls on improperly propagated agent systems (stolen or modified agents and multi-agent systems), and resistance to reverse engineering of agents and multi-agent systems. The primary innovation is to give the agent early in its lifecycle active mechanisms to enforce integrity policies and constraints through introspection into its environment (including operating system and hardware platform, and its sensory and effectors coupled to its external environment) and intercessory controls on its own internal structure (including operating system, applications and hardware platform). Policies and constraints are protected by the agent at all phases of its lifecycle, and strict authorizations are enforced for changes from programmers, users, administrators and other potentially malicious or disruptive entities it encounters during its lifecycle. This is accomplished by a meta-structure that reasons about the purpose, structure, function, and behavior of internal (base) elements of the agent actively during all phases of its lifecycle maintaining homeostatic controls that accomplish policy and constraint enforcement while allowing development and adaptation to occur freely within those constraints.

The ultimate intention of the invention is to deliver agent systems with lifecycle-scope assurance statements to increase confidence in the systems for national security and high-consequence applications.

An agent generator is a precursor program that accepts the organization's policies, requirements, constraints, and specifications for an agent or multi-agent system. It generates one or more agents that actively enforce the organization's original intentions throughout development and deployment.

According to exemplary embodiments of the invention, while an agent generator is generating an intelligent agent, it also evaluates the data processing platform on which it is executing, in order to assess a risk factor associated with operation of the agent generator on the data processing platform. In some embodiments, the agent generator retrieves from a location external to the data processing platform an open site that is configurable by the user. The agent generator loads the open site into an agent substrate, thereby creating a development agent with code development capabilities. In some embodiments, while an intelligent agent is executing a functional program on a data processing platform, it also evaluates the data processing platform to assess a risk factor associated with performing the data processing function on the data processing platform.

DETAILED DESCRIPTION

The term intelligent agent within the context of the present invention can refer, for example, to a concentration of computation that is autonomous, introspective, long-lived, cooperative, secure and robust.

In some embodiments, intelligent agents are built on a substrate of distributed dynamic objects, which provide a computing location-independent, object-oriented programming metaphor, with long-lived objects. A distributed object includes an object whose services can migrate among nodes on a network and execute on different nodes at different times. A dynamic object includes an object whose structure and class membership can be changed at run time without stopping and restarting the system. Object classes can be objects themselves, and can be distributed as meta-data (for example, higher-level organized forms of data). The above-described object-oriented flexibility is useful in computing environments where software must adapt continuously over its lifetime without requiring that it be stopped, recompiled, and restarted. Intelligent agents according to exemplary embodiments of the invention include collections of distributed dynamic objects and metaobjects with the additional capabilities of reaction, deliberation, secure collaboration and goal satisfaction.

According to exemplary embodiments of the invention, implemented instances of intelligent agents include processes (for example, computational programs) that execute under an operating system (for example, Linux, NacOS, UNIX, Windows NT) on commercially available conventional computing hardware platforms. In some embodiments, intelligent agents are implemented on specialized hardware-based platforms. Some embodiments utilize object-oriented programming languages because they are suitable for developing long-lived distributed dynamic objects functioning as intelligent agents.

Figure 2:
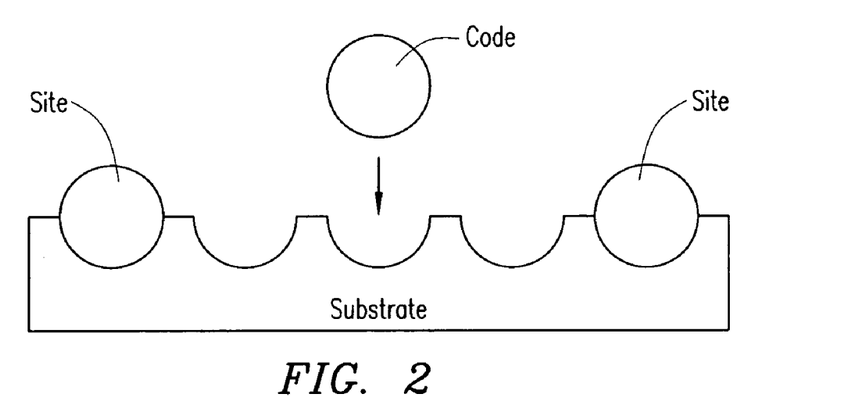
FIG. 2 diagrammatically illustrates the construction of a multi-site agent according to exemplary embodiments of the invention.

Exemplary embodiments of the invention provide an object-oriented adaptive framework that supports the development of high-integrity intelligent agent programs for a broad range of applications. Such a framework is implemented, in various exemplary embodiments, on a general purpose computer, or on a special-purpose computer (for example, a LISP processing computer or a parallel-processing computer). FIG. 2 diagrammatically illustrates exemplary embodiments of an intelligent agent according to the invention. The agent in FIG. 2 includes multiple instances of a primary abstraction called a site. The site is a software structure that performs a specific function (for example, sensation, perception, actuation or deliberation). Any given site can be redundant, overlapping in functionality with other sites, in order to enhance fault tolerance and load leveling. The constituent sites of a multi-site agent operate as software components within an agent substrate. In some embodiments, the agent substrate is a common programming environment embedded in an active process, such as a CLOS process, that implements the corpus of the agent. A site is created when a code module containing the site is loaded into the substrate or common programming environment, as shown in FIG. 2. Once instantiated, the site becomes part of the agent, and it can connect to any other sites of the agent through its specified interfaces.

In some embodiments, each site has associated therewith a private process (for example, a lightweight thread in a single process implementation) in which all housekeeping functions execute. In general, housekeeping functions perform general operations common to all sites to maintain proper operation of the site. Housekeeping functions can include, for example, intra-site communications, fault tolerance, agent initialization, fault monitoring, state-of-health handshake (for example, watch dog monitor), performance monitoring, and site re-programming.

Exemplary embodiments of the invention provide an adaptive agent framework which can assist a developer in designing an intelligent agent that can function effectively in the type of complex, dynamic environments typically encountered by intelligent agents. The framework can assist the designer in developing customized modifications in an agent, and can also help prevent the development from proceeding in an unproductive or undesirable direction. The framework provides a highly intelligent development system with policy constraints, in order to assist the developer, early in the design cycle, in the development of a higher quality product. The framework includes an agent generator which receives policy inputs regarding the target environment, and can create a development agent that knows the target environment, knows the prevalent techniques for performing a desired functionality, and has human interaction capabilities.

Figure 3:
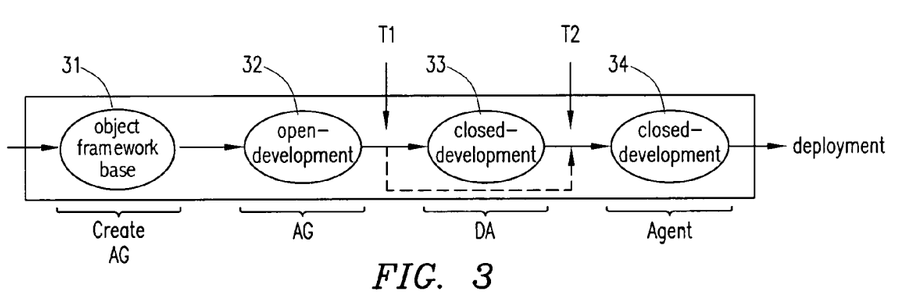
FIG. 3 diagrammatically illustrates the creation of agent generators, development agents, and agents according to exemplary embodiments of the invention.

FIG. 3 diagrammatically illustrates how an agent generator, a development agent, and an agent can be created according to exemplary embodiments of the invention. As shown in FIG. 3, a developer can use Object Framework Base at 31 to create an agent generator (AG), and can thereafter use the agent generator in an open development environment at 32 to create either a development agent (DA) or an end-product agent which is ready for deployment as a closed system 34. An agent generator is a software tool for creating agents and development agents. If the agent generator is used to generate a development agent, then that development agent is used as a closed development environment 33 to produce the end product agent embodied by the closed system 34. Otherwise, the developer uses the agent generator in the open development environment 32 to produce the end product agent directly, as illustrated generally by broken line in FIG. 3.

Figure 4:
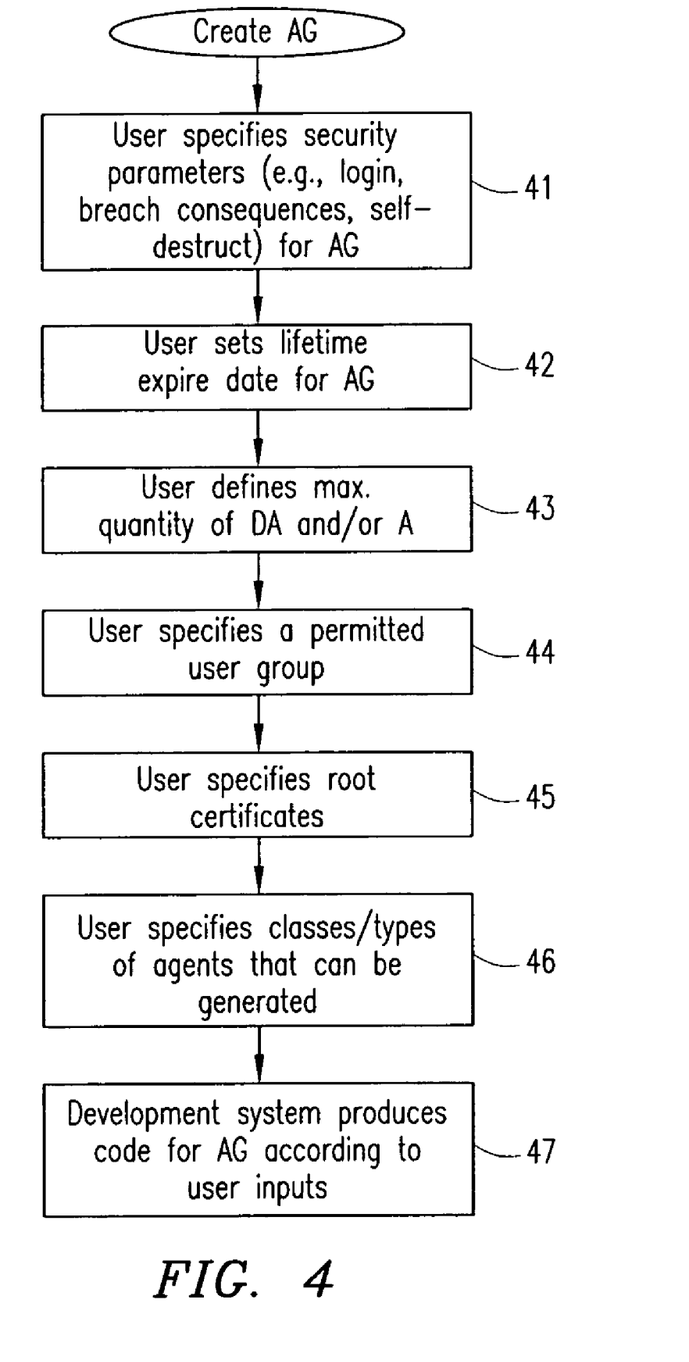
FIG. 4 illustrates exemplary operations which can be used to create an agent generator according to the invention.

FIG. 4 illustrates operations which can be performed during Object Framework Base phase 31 in FIG. 3 to create an agent generator AG according to exemplary embodiments of the invention. At 41, the user (i.e., the developer) specifies (e.g., in response to a menu option) various security parameters that are to be implemented by the agent generator. Examples of such security parameters are log-in security parameters, the consequences of detecting a breach of security, the conditions which will trigger the agent generator to self-destruct, and the actions to be taken by the agent generator to implement its self-destruction. In various embodiments, the agent generator can implement its self-destruction by one or more of the following: removing one or more of its critical components; shutting itself off; and destroying critical policy and code elements to prevent misuse.

At 42, the user sets a lifetime expiration date for the agent generator, thereby insuring that the agent generator has a limited finite lifetime. At 43, the user defines a maximum number of development agents and/or agents that can be created by the agent generator. At 44, the user specifies a permitted group of users that will be permitted to operate the agent generator. At 45, the user specifies root certificates that will establish security credentials for the agent generator (and ultimately for the agent) to engage other programs and be validated by those other programs. At 45, the user specifies the classes/types of agents that can be generated by the agent generator.

At 47, the development system that supports the development environment 31 of FIG. 3 uses the inputs received from the user at 41-46 of FIG. 4 to produce code for the agent generator according to the received inputs. In various embodiments, the development system produces the necessary code by accessing a code base, by generating the code intrinsically, or by both accessing a code base and generating code intrinsically.

In some embodiments, one of the security parameters specified at 41 in FIG. 4 is a host introspection feature. An agent generator (or development agent or deployed agent) having a host introspection feature can look at the state of the hardware and the operating system of the target platform on which the agent generator (or development agent or deployed agent) is running, in order to make sure that the state of the platform is acceptable from a security perspective and/or from a computing resource availability perspective. If host introspection has been specified as a security parameter at 41, then at 47, the development system produces code, for example an expert system, for implementing the host introspection. In various embodiments, the host introspection module is capable of examining one or more of the following: the file system of the target platform; other programs running on the target platform; the hardware of the target platform; other users of the target platform; and memory use and allocation, including disk space use and allocation, on the target platform. The host introspection module utilizes the operating system of the target platform to make these examinations. Unusual or unexpected use/allocation of resources such as those listed above can indicate the possibility of security-breaching activity (e.g. hacker activity) and/or the possibility of insufficient resource availability to accomplish agent generation (or agent operation). The host introspection module can use information obtained from one or more examinations of the type described above, in combination with the security policies in place, to assess the risk that the target platform poses to the agent generator (or ultimately the agent).

Figure 5:
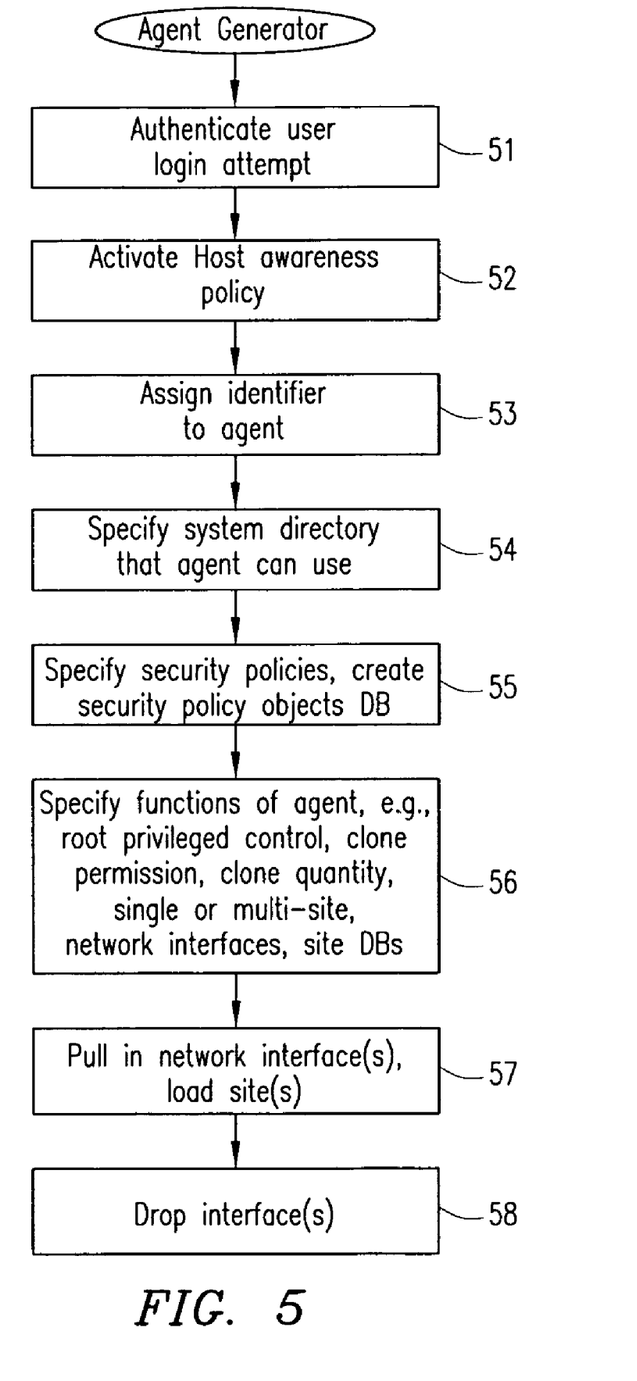
FIG. 5 illustrates exemplary operations which can be used by an agent generator to generate an agent or a development agent according to the invention.

FIG. 5 illustrates operations which can be performed by an agent generator according to exemplary embodiments of the invention. After authenticating the user's login attempt at 51, the agent generator activates a host awareness policy at 52. In some embodiments, the host awareness policy will specify host introspection functionality of the type described above. In other embodiments the host awareness policy specifies both host introspection and host intersession. Host intersession functionality puts the agent in charge of the entire target platform, giving the agent the ability to actively intercede in the operations of the target platform in order to control its own execution environment. Root privileges as described above can permit the exercise of host intersession functionality.

In some embodiments, the agent generator (or development agent or deployed agent) may utilize host introspection functionality and the specified security policies to assess the risk that the platform poses. In addition to the aforementioned actions that may be taken in host introspection, for example providing a security alert to the user, host intersession can also take affirmative actions in response to the results of host introspection. These actions will attempt as far as possible to reconcile the target platform to the established security policies. Some exemplary host intersession actions include shutting down some function on the target platform, patching a function on the target platform, changing the permission level of a user of the target platform, and evicting users from the target platform.

After the host awareness policy has been activated at 52, all subsequent operations of the agent generator will be performed in conjunction with operation of the host introspection and/or host intersession functionality.

An identifier is assigned to the agent at 53, after which the user specifies at 54 a system directory (or directories) that the agent can use. At 55, the user specifies security policies and, in response to the security policies, the agent generator creates a security policy objects database (DB). The security policy objects database can be produced by an expert module based on input parameters such as desired security level, whether creating an agent or development agent, criticality of various security breaches, the target platform and OS, and the application for which the agent will be deployed.

At 56, the user specifies the desired functions of the agent, for example, root privileges control, host introspection/intersession, permission to clone itself, the quantity of clones that may be produced, whether the agent is to be a single site agent or a multi-site agent, the network interface(s) that will be needed to provision the agent, and the locations from which sites can be retrieved to construct the agent, for example identification of one or more site databases.

An agent can be permitted to clone itself, download clones to other nodes and produce clones of different "flavors" for similar but non-identical applications. Cloned agents can mediate/negotiate among themselves to divide labor.

At 57, the agent generator pulls in the interface(s) needed to load the specified site(s), and then loads the specified site(s) into the agent substrate (see also FIG. 2). After the provisioning operations at 57, the functionality of the agent (or development agent) is in place, so at 58 the agent generator can drop (remove from itself) the interface(s) used for inputting the security policies and/or loading the site(s), thereby resulting in the desired agent or development agent. The operations at 58 in FIG. 5 correspond generally to the transition T1 illustrated in FIG. 3, wherein the agent generator AG transitions into either a development agent DA or a deployable agent.

Figure 6:
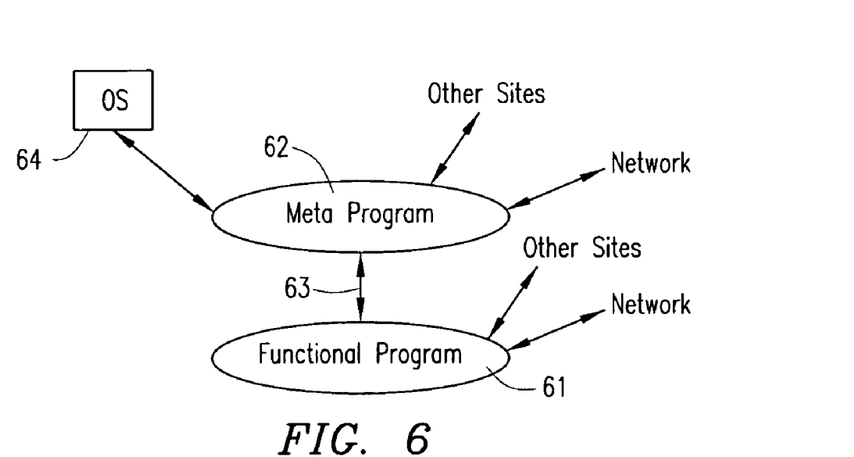
FIG. 6 diagrammatically illustrates a portion of an intelligent agent according to exemplary embodiments of the invention.

FIG. 6 diagrammatically illustrates a site in a completed agent according to exemplary embodiments of the invention. The site includes a functional program 61 which is generally responsible for the core functionality associated with the site, a metaprogram 62, and an interface 63 for interfacing between the functional program and the meta program. The meta program is responsible for communication with other sites, either within the same agent or within other cooperating agents, and also interfaces with the operating system 64 of the target platform in order to support host introspection/intersession functionality. In some embodiments, the meta program 62 supports in-situ reprogramming of the site (e.g., the functional program 61) over a suitable data communications network. The functional program 61 can include one or more network interfaces and one or more interfaces (via the substrate of FIG. 2) to one or more other sites within the agent.

Figure 7:
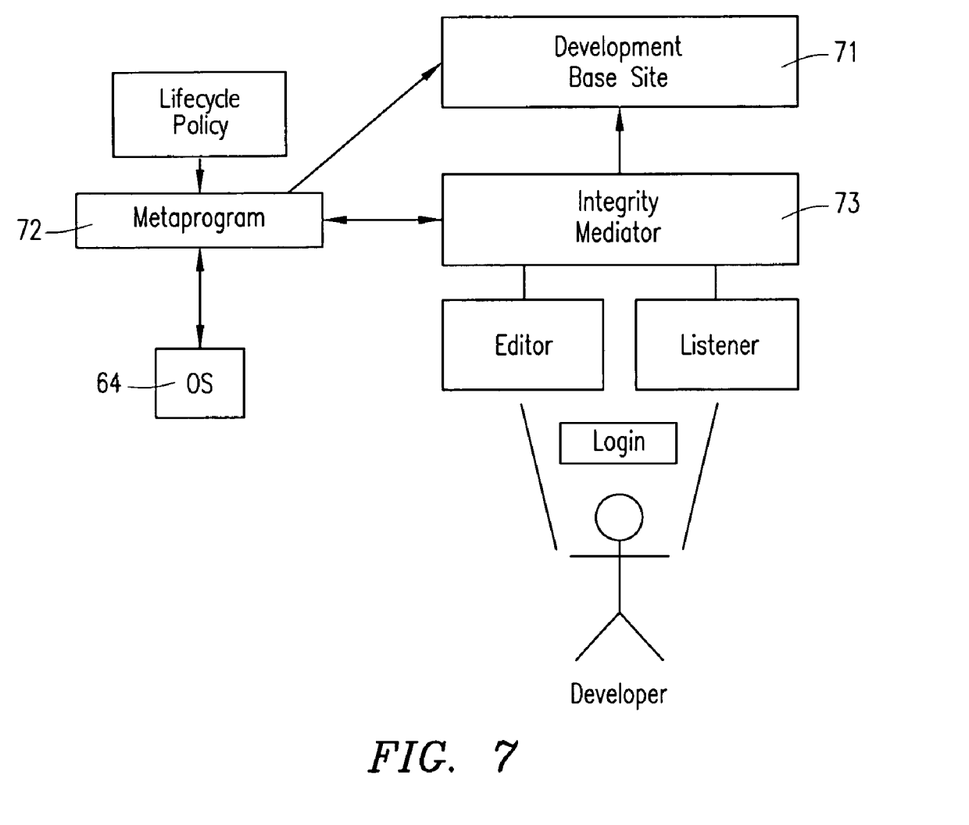
FIG. 7 diagrammatically illustrates a portion of a development agent according to exemplary embodiments of the invention.

FIG. 7 diagrammatically illustrates a site in a development agent according to exemplary embodiments of the invention. In the development agent of FIG. 7, the development base site 71 corresponds to the functional program (see also 61 of FIG. 6) of the site. The metaprogram block 72 generally corresponds to the meta program 62 in FIG. 6, but provides the additional service of supporting site development operations.

In the development agent of FIG. 7, development activities are mediated through a mediator 73 controlled by the metaprogram block 72. The metaprogram block 72 utilizes the mediator 73 to administer the security policy and set desired constraints on development activities. In some embodiments, the security policy specifies commands, key bindings, programming languages, and development tools. All of these parameters are enforced by the mediator 73. Once a developer successfully logs in, that person can utilize the illustrated editor and listener functions to develop code within the functional program of the development base site 71. In some embodiments, the mediator 73 can report security violations, errors and other irregularities to the metaprogram 72. The meta program monitors development activities, errors and other irregularities in the development process, and the security state in general. In some embodiments, the metaprogram block 72 cooperates with the operating system 64 of the target platform in order to implement the aforementioned host introspection/intersession functionality.

The development site of FIG. 7 is an open (configurable by the user) site. The agent generator AG would receive from the user/developer information indicative of where such an open site can be obtained (see also 56 in FIG. 5), and would then instantiate the open site in the agent substrate (see also FIG. 2).

When development activities have been completed, the development agent of FIG. 7 can drop (i.e. remove from the open site) code development capabilities (or tools) such as the integrity mediator 73, the editor, the listener, and the developer login functionality, thereby to transform itself into an agent that is ready for deployment. This is basically a closing of what was previously an open site, but without necessarily eliminating the aforementioned capability for in-situ reprogramming via the metaprogram. The transformation from development agent into agent is also illustrated generally at T2 in FIG. 3.

Although exemplary embodiments of the invention have been described above in detail, this does not limit the scope of the invention, which can be practiced in a variety of embodiments.

What is claimed is:

1. A method of generating an intelligent agent, comprising:
a developer using an agent-generating software tool that executes on a data processing platform to construct an intelligent agent, including using the software tool to load a site into an agent substrate;
the developer specifying security parameters that are to be implemented by the agent-generating software tool; and
during said first-mentioned using step, the software tool evaluating the data processing platform to assess a risk factor associated with constructing the intelligent agent on the data processing platform;
the method further comprising giving the intelligent agent active mechanisms to actively enforce immutable integrity policies and constraints on the agent's lifecycle properties, through introspection into the agent's environment, throughout the agent's lifecycle phases of specification, design, construction, coding, testing, deployment, and decommissioning;
wherein said policies and constraints are protected by the agent at all phases of its lifecycle, and strict authorizations are enforced for changes from programmers, users, administrators, and other potentially malicious or disruptive entities it encounters during its lifecycle;
thereby increasing the confidence in systems that use the intelligent agent for national security and high-consequence applications.

2. The method of claim 1, wherein said evaluating step includes examining one or more of the following selected from the group consisting of a file system of the data processing platform, another program running on the data processing platform, hardware of the data processing platform, another user of the data processing platform, memory use on the data processing platform, and memory allocation on the data processing platform.

3. The method of claim 2, wherein said evaluating step includes using information obtained during said examining step in combination with information contained in a security policy to assess said risk factor.

4. The method of claim 1, including, in response to said evaluating step, the software tool disabling a portion of itself to prevent misuse.

5. The method of claim 1, including, after said using steps, the software tool removing a portion of itself, thereby to transition itself into the intelligent agent.

6. The method of claim 5, wherein said removing step includes the software tool removing an interface portion thereof.

7. The method of claim 1, wherein said generating an intelligent agent includes:
a developer using a software tool that executes on a data processing platform to retrieve from a location external to the data processing platform an open site that is configurable by a user; and
a developer using the software tool to load the open site into an agent substrate.

8. The method of claim 7, including developing code within the open site, and thereafter removing from the open site software tools that supported said code developing step.

9. The method of claim 8, including, concurrently with said code developing step, administering a security policy with respect to said code development.

10. The method of claim 9, wherein said administering step includes setting a constraint on code development activities performed during said code development step.

11. The method of claim 9, wherein said security policy specifies one or more of the following selected from the group consisting of a command, a key binding, a programming language, and a development tool.

12. The method of claim 7, including developing code within the open site and, concurrently with said code developing step, evaluating the data processing platform to assess a risk factor associated with developing code within the open site on the data processing platform.

13. The method of claim 12, wherein said evaluating step includes examining one or more of the following selected from the group consisting of a file system of the data processing platform, another program running on the data processing platform, hardware of the data processing platform, another user of the data processing platform, memory use on the data processing platform, and memory allocation on the data processing platform.

14. The method of claim 13, wherein said evaluating step includes using information obtained during said examining step, in combination with information contained in a security policy to assess said risk factor.

15. The method of claim 12, including, concurrently with said code developing step, administering a security policy with respect to said code development.

16. The method of claim 15, wherein said administering step includes setting a constraint on code development activities performed during said code development step.

17. The method of claim 15, wherein said security policy specifies one or more of the following selected from the group consisting of a command, a key binding, a programming language, and a development tool.

18. A method of intelligent agent operation, comprising:

executing on a data processing platform a functional program of an intelligent agent to perform a data processing function associated with the intelligent agent; and during said executing step, the intelligent agent evaluating the data processing platform to assess a risk factor associated with performing the data processing function on the data processing platform;

wherein the intelligent agent comprises active mechanisms to actively enforce immutable integrity policies and constraints during the agent's execution through introspection into the agent's environment;

wherein said policies and constraints are protected by the agent at all phases of its lifecycle, and strict authorizations are enforced for changes from programmers, users, administrators and other potentially malicious or disruptive entities it encounters during its lifecycle;

thereby increasing the confidence in systems that use the intelligent agent for national security and high-consequence applications.

19. The method of claim 18, wherein said evaluating step includes examining one or more of the following selected from the group consisting of a file system of the data processing platform, another program running on the data processing platform, hardware of the data processing platform, another user of the data processing platform, memory use on the data processing platform, and memory allocation on the data processing platform.

20. The method of claim 19, wherein said evaluating step includes using information obtained during said examining step, in combination with information contained in a security policy to assess said risk factor.

* * * * *